(12) United States Patent
Jo et al.

(10) Patent No.: US 10,742,784 B1
(45) Date of Patent: Aug. 11, 2020

(54) ROLL-SLIDE MOBILE TERMINAL

(71) Applicant: LG ELECTRONICS INC., Seoul (KR)

(72) Inventors: Junghyun Jo, Seoul (KR); Chalkee Jung, Seoul (KR); Sehoon Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/545,476

(22) Filed: Aug. 20, 2019

(30) Foreign Application Priority Data

Apr. 25, 2019 (KR) .......................... 10-2019-0048567

(51) Int. Cl.
  *H04M 1/00* (2006.01)
  *H04M 1/02* (2006.01)

(52) U.S. Cl.
  CPC ....... *H04M 1/0239* (2013.01); *H04M 1/0268* (2013.01)

(58) Field of Classification Search
  CPC .......................... H04M 1/0239; H04M 1/0268
  USPC ..................................................... 455/575.4
  See application file for complete search history.

(56) References Cited

U.S. PATENT DOCUMENTS

| | | | | |
|---|---|---|---|---|
| 6,841,618 B2* | 1/2005 | Masuda | ............... | C08L 23/0861 525/57 |
| 7,529,571 B2* | 5/2009 | Byun | ................... | H04M 1/0237 16/334 |
| 7,752,712 B2* | 7/2010 | Chuan | ................... | G06F 1/1601 16/239 |
| 7,991,443 B2* | 8/2011 | Chiang | ..................... | E05D 7/00 16/284 |
| 8,014,842 B2* | 9/2011 | Kuga | .................. | H04M 1/0237 455/550.1 |
| 8,103,321 B2* | 1/2012 | Li | ......................... | H04M 1/0237 248/244 |
| 8,155,718 B2* | 4/2012 | Byun | .................. | H04M 1/0237 16/330 |
| 8,437,814 B2* | 5/2013 | Lee | ......................... | G03B 17/02 206/703 |
| 8,463,326 B2* | 6/2013 | Aghaei | ............... | H04M 1/0241 455/566 |

(Continued)

*Primary Examiner* — Marceau Milord
(74) *Attorney, Agent, or Firm* — Birch, Stewart, Kolasch & Birch, LLP

(57) ABSTRACT

A roll-slide mobile terminal including a first frame; a second frame configured to slide with respect to the first frame in a first direction; a first roller provided in one first-direction end of the second frame; a third frame provided in a rear surface of the second frame; a flexible display unit having one end fixed to the first frame and the other end coupled to the third frame and being bent towards a rear surface when rolled around the first roller; and a drive unit configured to guide a sliding movement of the first frame with respect to the second frame in the first direction to transition the roll-slide mobile terminal from a first state in which the flexible display unit is bent towards the rear surface to a second state in which the flexible display unit is extended in the first direction, and to guide a sliding movement of the first frame with respect to the second frame in a second direction opposite the first direction to transition the roll-slide mobile terminal from the second state to the first state.

20 Claims, 13 Drawing Sheets

(56) References Cited

U.S. PATENT DOCUMENTS

| | | | | |
|---|---|---|---|---|
| 8,471,820 B2* | 6/2013 | Holman, IV | | G06F 1/1622 |
| | | | | 345/169 |
| 8,505,167 B2* | 8/2013 | Kim | | E05D 11/1014 |
| | | | | 16/239 |
| 8,593,801 B2* | 11/2013 | Minowa | | H04M 1/0237 |
| | | | | 361/679.3 |
| 8,908,370 B2* | 12/2014 | Chou | | H04M 1/0237 |
| | | | | 361/679.55 |
| 9,237,212 B2* | 1/2016 | Lee | | H04M 1/0233 |
| 10,340,622 B2* | 7/2019 | Jo | | H01R 13/506 |
| 10,446,913 B2* | 10/2019 | Jo | | H04M 1/0202 |
| 10,468,816 B2* | 11/2019 | Cha | | H01R 13/5219 |
| 10,491,728 B2* | 11/2019 | Jo | | H04M 1/18 |
| 2003/0034688 A1* | 2/2003 | Sumi | | B60B 7/02 |
| | | | | 301/37.33 |
| 2003/0064758 A1* | 4/2003 | Mizuta | | H04M 1/0212 |
| | | | | 455/566 |
| 2003/0203747 A1* | 10/2003 | Nagamine | | H04M 1/0243 |
| | | | | 455/575.3 |
| 2004/0085739 A1* | 5/2004 | Lee | | H04M 1/0237 |
| | | | | 361/727 |
| 2004/0203517 A1* | 10/2004 | Park | | H04M 1/0227 |
| | | | | 455/90.3 |
| 2005/0005399 A1* | 1/2005 | Lu | | G06F 1/162 |
| | | | | 16/367 |
| 2005/0107137 A1* | 5/2005 | Byun | | H04M 1/0237 |
| | | | | 455/575.1 |
| 2006/0030381 A1* | 2/2006 | Byun | | H04M 1/0237 |
| | | | | 455/575.4 |
| 2006/0060737 A1* | 3/2006 | Jeun | | H04M 1/0237 |
| | | | | 248/289.11 |
| 2010/0227650 A1* | 9/2010 | Kim | | G06F 1/1616 |
| | | | | 455/566 |
| 2010/0299348 A1* | 11/2010 | Gill | | G06F 16/2428 |
| | | | | 707/769 |

* cited by examiner

FIG. 2
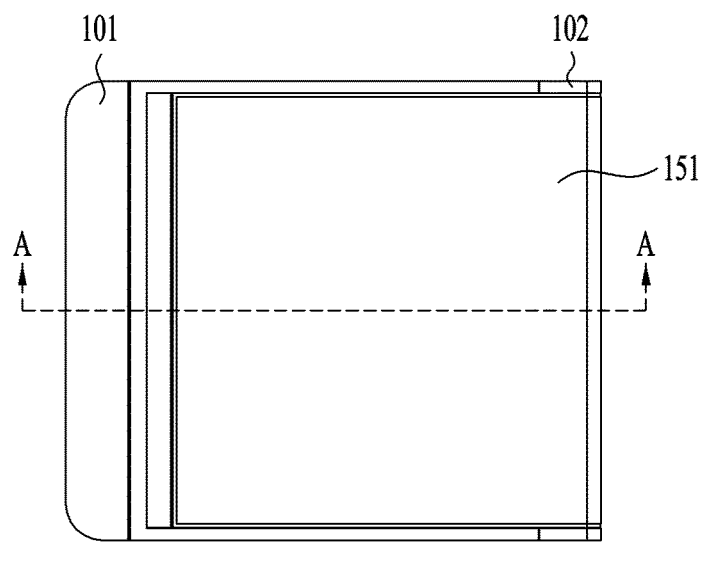
(a)
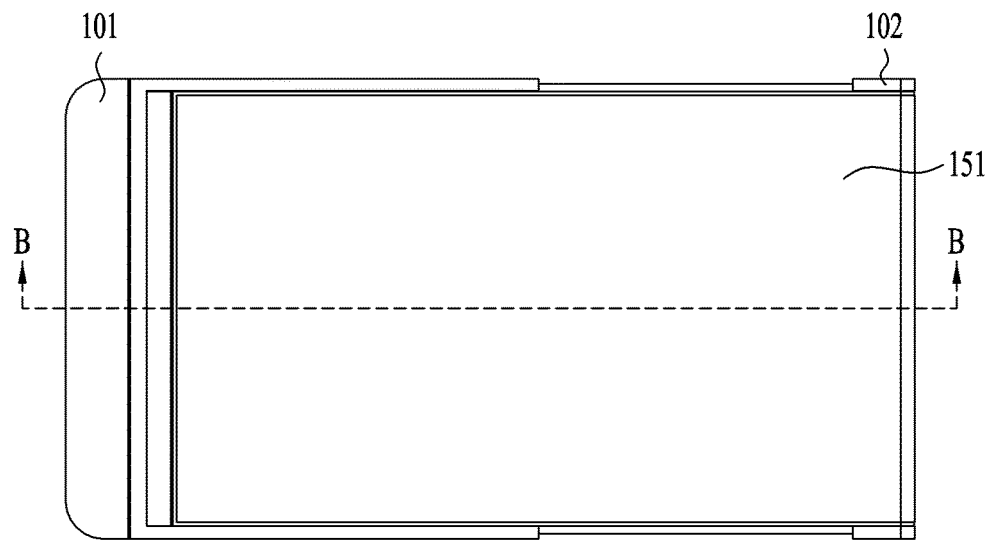
(b)

FIG. 3
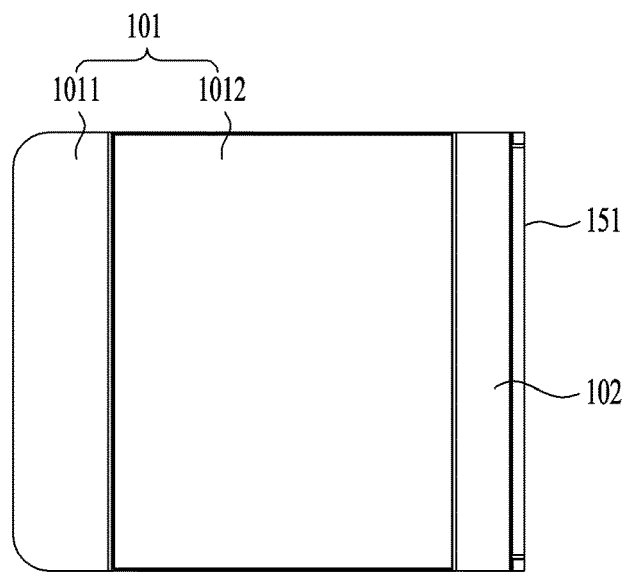
(a)
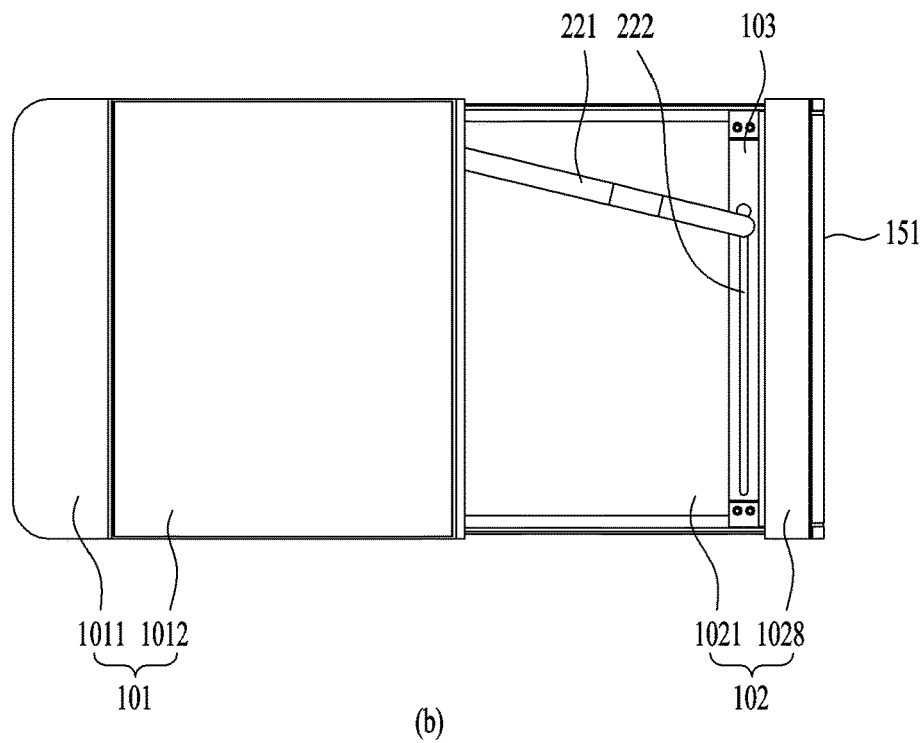
(b)

FIG. 9
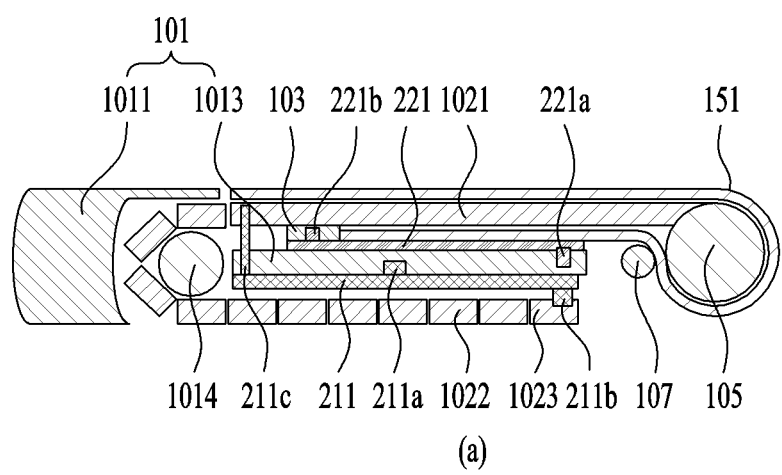
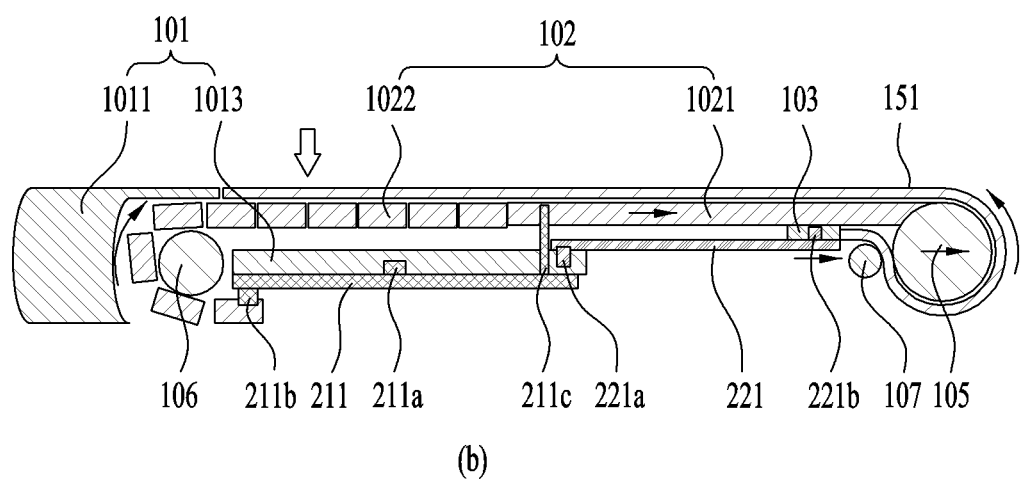

FIG. 10
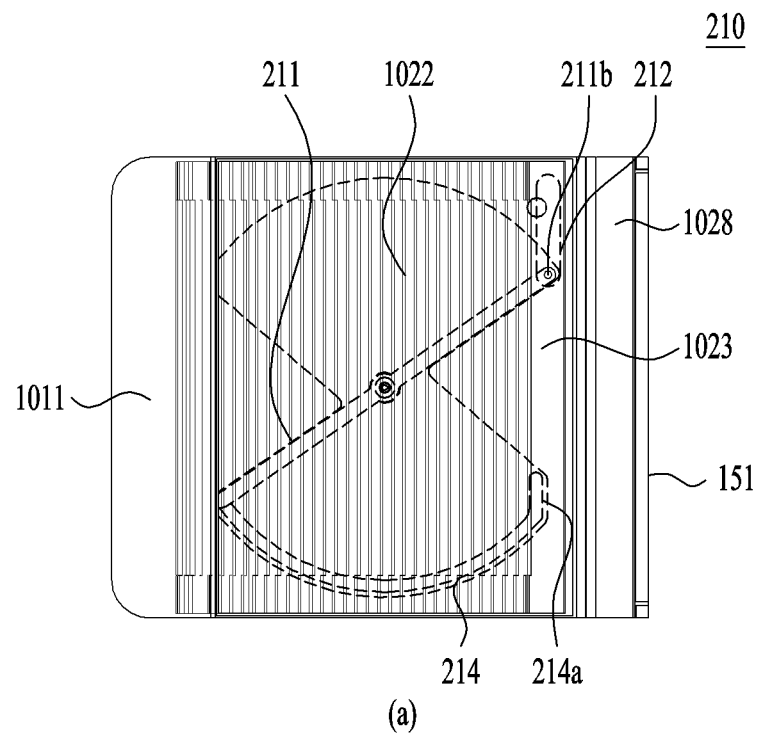
(a)
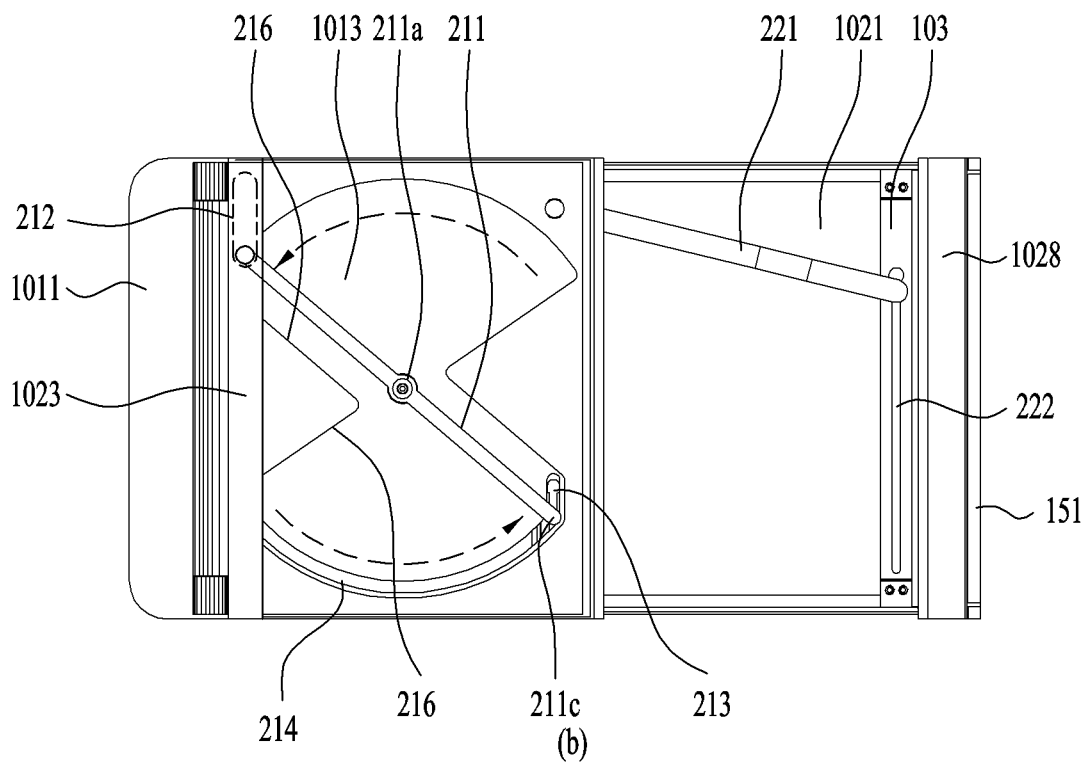
(b)

FIG. 11
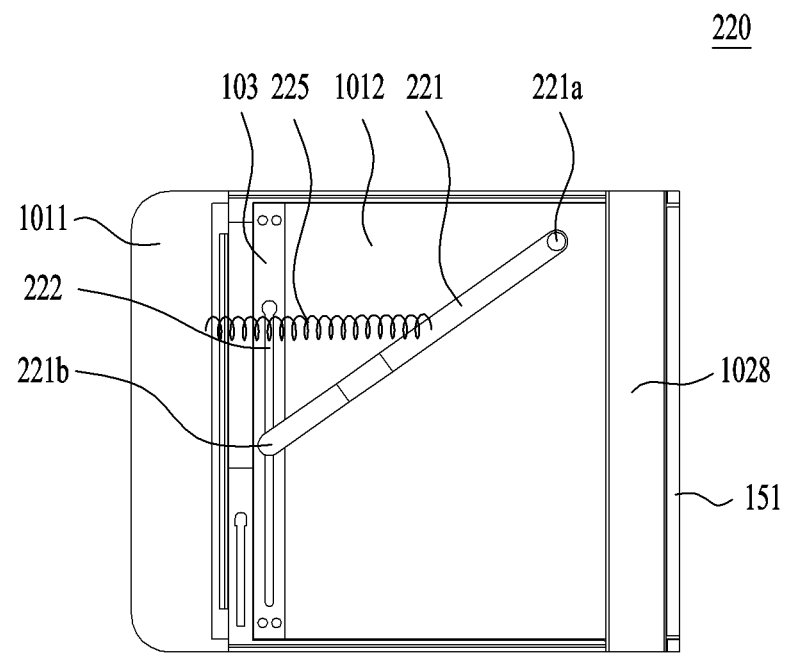
(a)
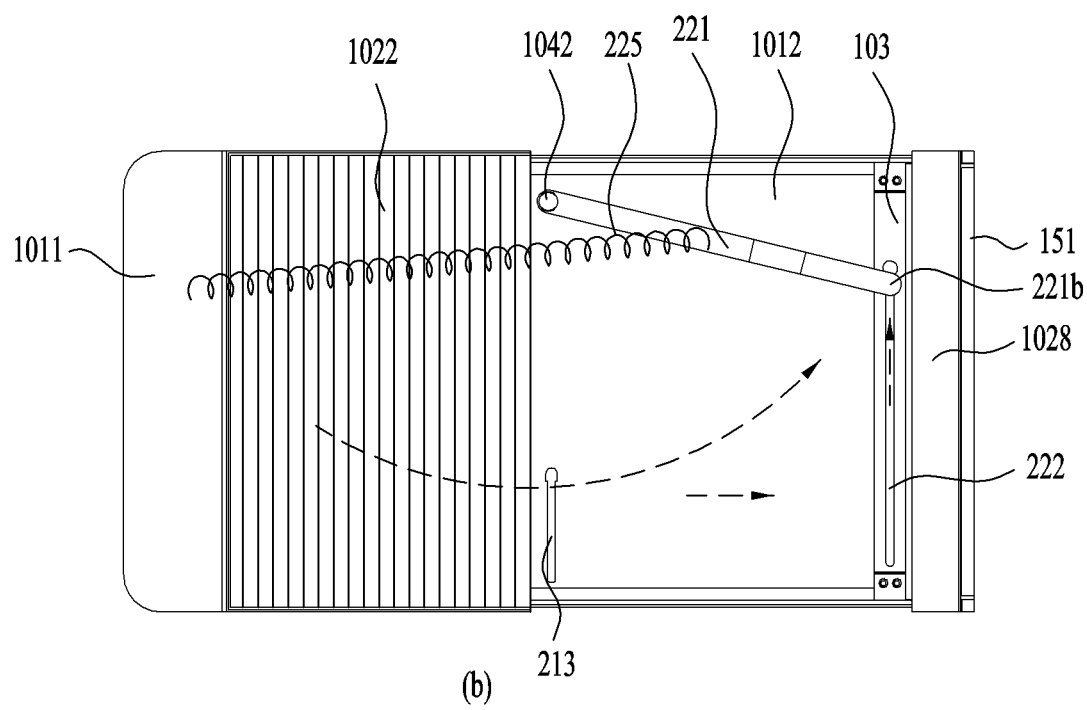
(b)

FIG. 12
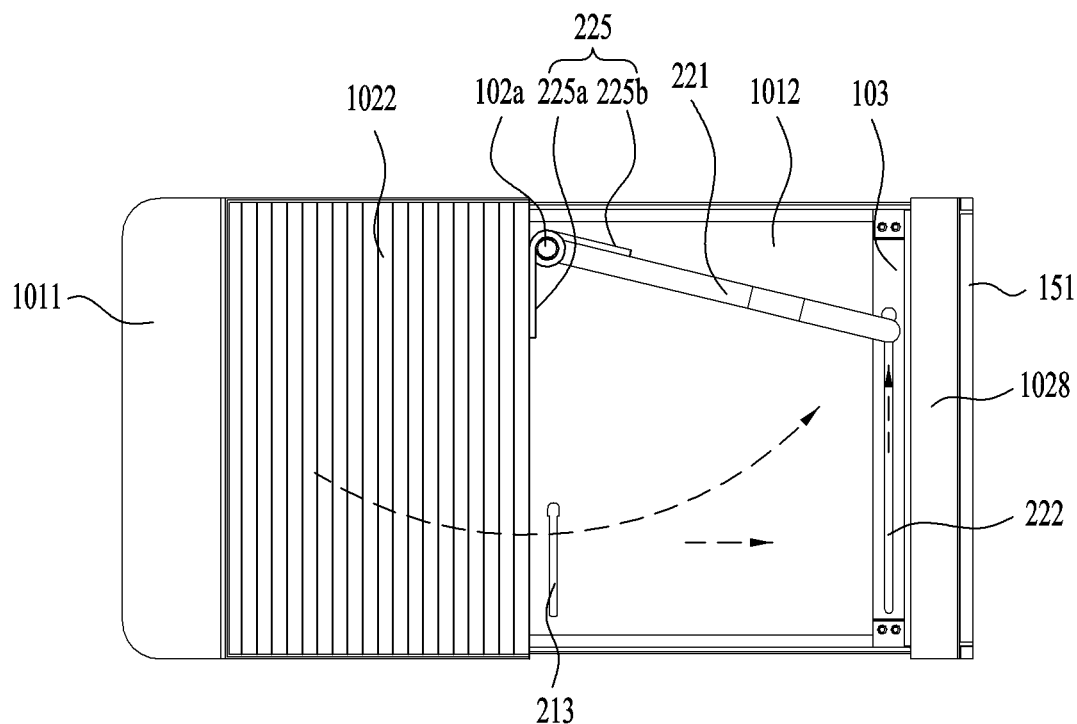
(a)
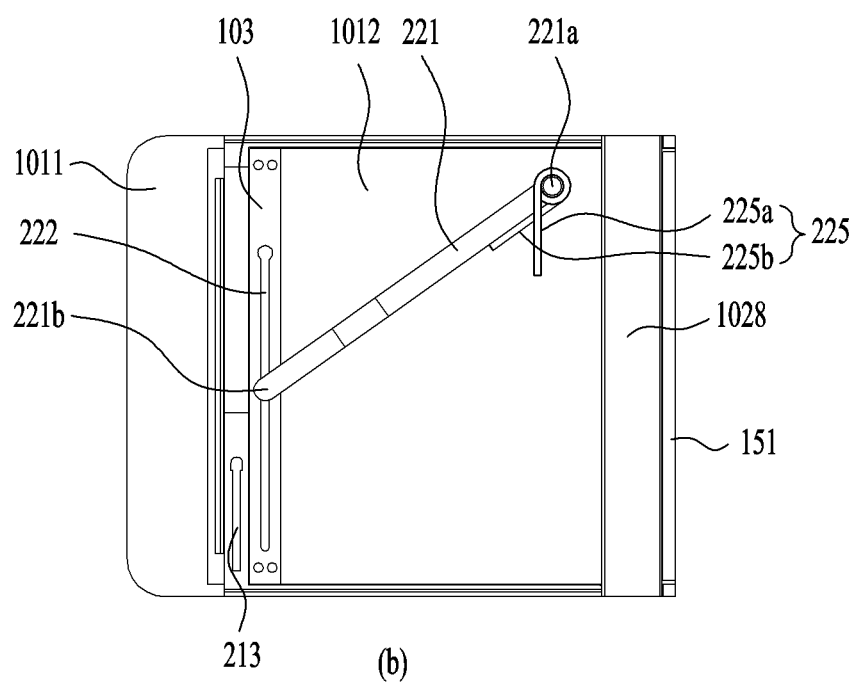
(b)

FIG. 13
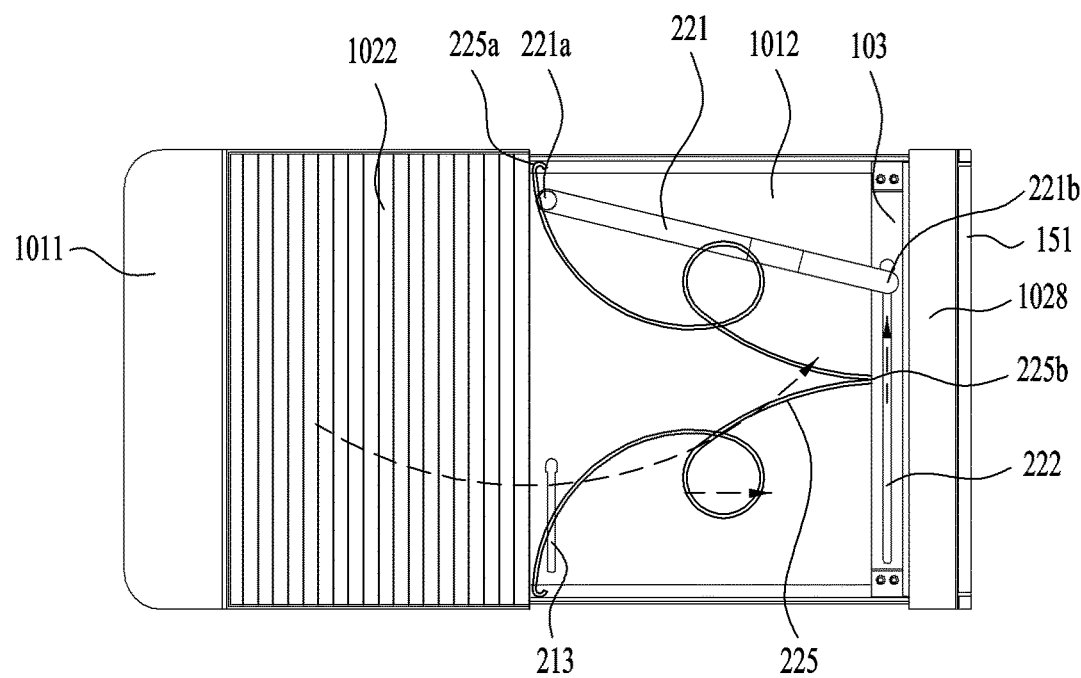
(a)
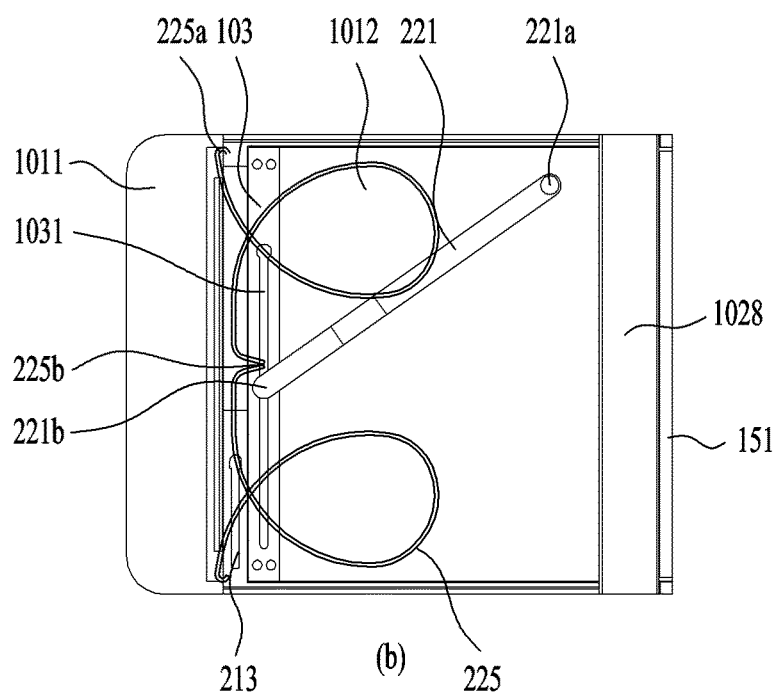
(b)

ROLL-SLIDE MOBILE TERMINAL

CROSS-REFERENCE TO RELATED APPLICATIONS

This Application claims the benefit of an earlier filing date and priority to Korean Application No. 10-2019-0048567 filed in the Republic of Korea on Apr. 25, 2019, the entire contents of which is hereby incorporated by reference in its entirety.

BACKGROUND OF THE INVENTION

Field of the Invention

Embodiments of the present disclosure relate to a roll-slide mobile terminal that has a flexible display and of which a screen is expandable.

Discussion of the Related Art

Terminals may be generally classified as mobile/portable terminals or stationary terminals. Mobile terminals may also be classified as handheld terminals or vehicle mounted terminals.

A display device is equipped with functions of receiving, processing and displaying user-viewable images. The display device, for example, receives broadcasting selected by a user from broadcast signals broadcasted by a broadcasting station, splits video signals from the received signals, and displays the split video signals on a display.

Recently, owing to the developments of broadcast and network technologies, functions of a display device have been considerably diversified and performance of the device has been improved correspondingly. Namely, the display device has been developed so as to provide a user with various contents as well as simply broadcasted contents. For example, the display device can provide game play, listening to music, Internet shopping, user-customized information and the like using various applications as well as programs received from broadcasting stations. In order to perform such extended functions, the display device is basically connected to other devices or a network using various communication protocols and can provide ubiquitous computing environments to a user. Namely, the display device has been evolved into a smart device that enables connectivity to a network and ubiquitous computing.

Recently, a flexible display having sufficient elasticity to enable big deformation has been developed. The flexible display may be deformed to be rolled. A mobile terminal receives the rolled flexible display and may protrude the display to the outside of its body at a desired size. Therefore, the mobile terminal can have a more compact size in accordance with a use of the flexible display. Also, as the mobile terminal includes such a rollable display, the mobile terminal can be referred to as a rollable mobile terminal.

In order to use the rollable mobile terminal, a user can eject the display from a body of the mobile terminal and at the same time the display can be extended to a size desired by the user. However, the display may be extended to various directions by the user, and relative alignment or arrangement of the display for the user may be varied depending on the extended direction. Therefore, in order to allow the user to view intended contents or screen, the mobile terminal needs to align contents or screen on the display in consideration of the varied display or relative alignment of the user. Moreover, the mobile terminal additionally needs to adjust the aligned contents in consideration of the extended direction and alignment.

SUMMARY OF THE INVENTION

Accordingly, an object of the present invention is to address the above-noted and other problems and provide a roll-slide mobile terminal capable of improving durability of a flexible display unit as a point where the flexible display unit is folded is limited to a specific position.

Another object of the present invention is to provide a roll-slide mobile terminal including a support structure of a flexible display unit, in which the flexible display unit may stably be supported when it is extended.

A further object of the present invention is to provide a roll-slide mobile terminal including a drive unit configured to guide the movements of a frame and a flexible display unit in communication which can prevent a corrugation generated in the flexible display unit separated from the frame, when the roll-slide mobile terminal is transited from a second state to a first state.

A sill further object of the present invention is to provide a roll-slide mobile terminal that prevents a flexible display unit from being damaged by external impact at a side where the flexible display is folded.

Embodiments of the present disclosure may provide a roll-slide mobile terminal including a first frame; a second frame configured to slide with respect to the first frame in a first direction; a first roller provided in one first-direction end of the second frame; a third frame provided in a rear surface of the second frame and configured to slide with respect to the second frame in the first direction; a flexible display unit having one end fixed to the first frame and extended in the first direction to be bent towards a rear surface by being rolled around the first roller; and the other end coupled to the third frame; and a drive unit configured to guide the sliding movements of the second and third frames, wherein the roll-slide mobile terminal is transited from a first state to a second state, when the second frame slides with respect to the first frame in the first direction, and the roll-slide mobile terminal is transited from the second state to the first state, when the second frame and the third frame slide in a second direction that is the reverse direction of the first direction.

Since the roll-slide mobile terminal of the present invention does not limit a point where the flexible display unit is folded to a specific position, durability of the flexible display unit may be improved. Also, since the flexible display unit may stably be supported when it is extended, it is possible to minimize difficulty in a touch input. Also, the flexible display unit from may be prevented from being damaged by external impact at a side where the flexible display is folded.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a perspective view illustrating a first state and a second state when a roll-slide mobile terminal according to an embodiment of the present invention is viewed at one side;

FIG. 3 is a rear view illustrating a first state and a second state of a roll-slide mobile terminal according to an embodiment of the present invention;

FIG. 9 is a conceptual diagram illustrating the roll-slide mobile terminal according to an embodiment of the present invention;

FIG. 10 is a diagram illustrating a first drive unit provided in the roll-slide mobile terminal;

FIG. 11 is a diagram illustrating a second drive unit provided in the roll-slide mobile terminal; and FIGS. 12 and 13 are diagrams illustrating another embodiment of the second drive unit provided in the roll-slide mobile terminal.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
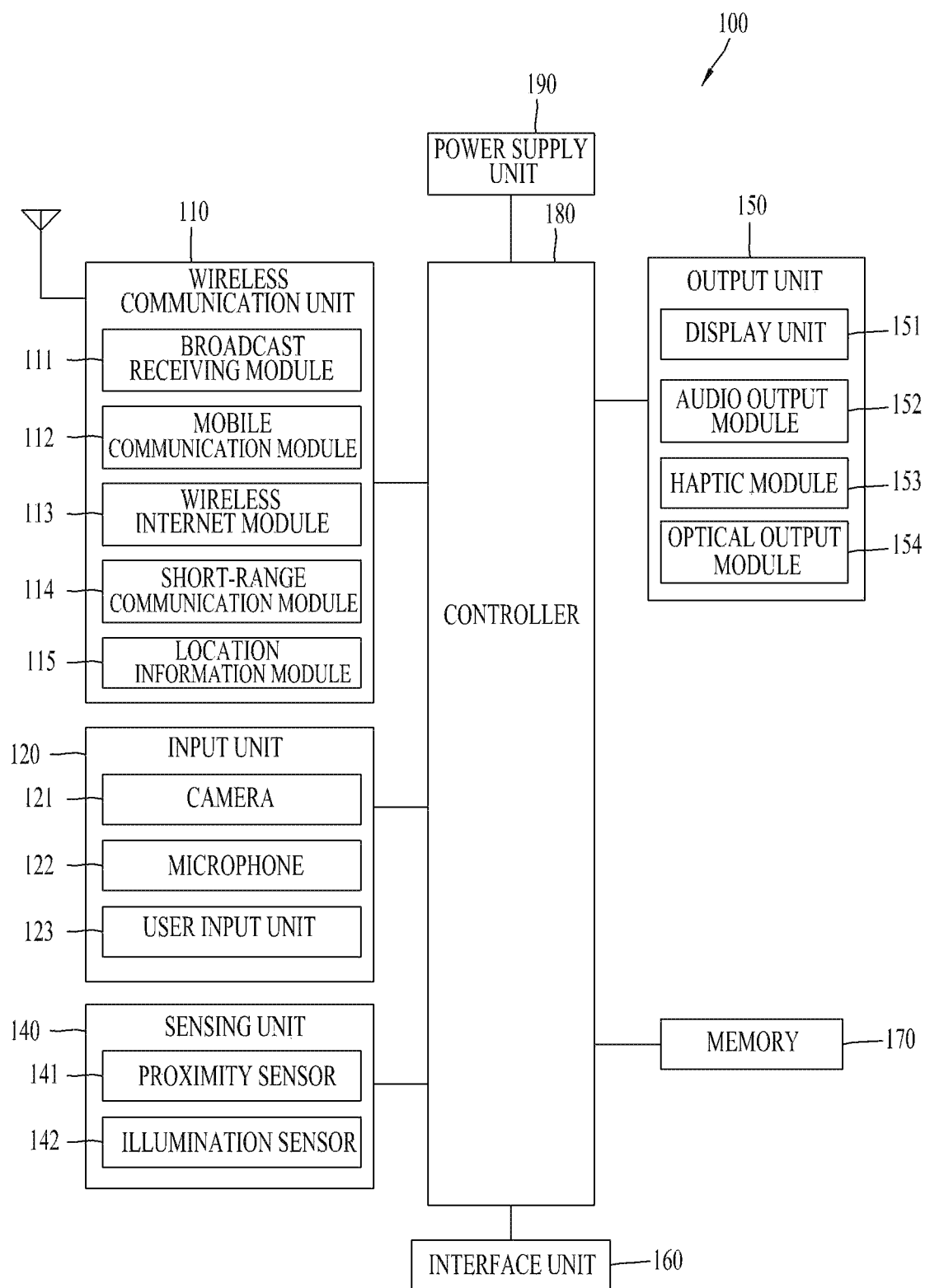
FIG. 1 is a block diagram of a role-slide mobile terminal according to an embodiment of the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1A. Moreover, the controller 180 can be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Next, FIG. 2 is a perspective view illustrating a first state and a second state when a roll-slide mobile terminal according to an embodiment of the present invention is viewed at one side, and FIG. 3 is a rear view illustrating a first state and a second state of a roll-slide mobile terminal according to an embodiment of the present invention. In particular, FIGS. 2(a) and 3(a) illustrate a first state of the roll-slide mobile terminal 100 according to one embodiment of the present invention, and FIGS. 2(b) and 3(b) illustrate a second state of a roll-slide mobile terminal 100 according to one embodiment of the present invention.

As shown, the roll-slide mobile terminal 100 of the first state has a size smaller than that of the roll-slide mobile terminal 100 of the second state in a first direction. In the roll-slide mobile terminal 100 of the second state, the size of the first direction is extended and a size of a display unit 151 arranged on a front surface becomes greater than the first state. In addition, a direction along which the roll-slide mobile terminal 100 is extended is referred to as a first direction, a direction along which the roll-slide mobile terminal 100 is contracted to be shifted from the second state to the first state is referred to as a second direction, and a direction vertical to the second direction is referred to as a third direction.

In a first state of the roll-slide mobile terminal 100 according to an embodiment of the present invention like a bar-type mobile terminal, a screen is expanded and changed into a second state. In the second state, the area of the display unit 151 arranged in the front surface is expanded in a first direction and the area of the display unit arranged in the rear surface as shown in FIG. 3 (b) is reduced. In other words, the display unit located in the rear surface in the first state is moved towards the front surface in the second state. For easy and convenient description sake, the area of the display unit 151 that is located in the front surface of the roll-slide mobile terminal 100 is defined as the first area and the area located in the rear surface of the roll-slide mobile terminal 100 is defined as the second area. The first area and the second can be changed based on the current state of the roll-slide mobile terminal 100.

In this way, a flexible display unit 151 which is bent may be used as the display unit such that the position of the display unit can be varied. In more detail, the flexible display means a display, which is manufactured on a thin and flexible substrate capable of being curved, bent, folded, twisted or rolled like a paper, and is lightweight and robust not to be easily broken while maintaining characteristics of the existing flat panel display.

Also, an electronic paper is based on a display technique to which a feature of a general ink is applied, and is different from the existing flat panel display in that it uses reflective light. The electronic paper can change information by using electrophoresis that uses a twist ball or capsule.

When the flexible display unit 151 is not deformed (for example, the state that the flexible display unit 151 has an infinite curvature radius, hereinafter, referred to as base state), a display area of the flexible display unit 151 becomes a plane. In a state (for example, the state having a finite curvature radius, hereinafter, referred to as a deformation state) deformed by an external force from the base state, the display area has a curved surface. As shown, information displayed in the deformation state may be visual information output to the curved surface. This visual information is implemented as luminescence of unit sub-pixels arranged in a matrix arrangement is controlled independently. The unit sub-pixel means a minimum unit for implementing one color.

In addition, the flexible display unit 151 can be arranged in a bent state (for example, the state bent in a vertical or horizontal direction) not a flat state in the base state. In this instance, if an external force is applied to the flexible display unit 151, the flexible display unit 151 can be deformed in a flat state (or less bent state) or a more bent state.

Further, the flexible display unit 151 may implement a flexible touch screen in combination with a touch sensor. If a touch is performed for a flexible touch screen, the controller 180 can perform a control corresponding to such a touch input. The flexible touch screen may be configured to sense a touch input even in the deformation state as well as the base state.

In addition, the touch sensor senses a touch (or touch input) applied to the touch screen by using at least one of various touch modes such as a resistive film mode, a capacitance mode, an infrared mode, an ultrasonic mode, and a magnetic field mode. As an example, the touch sensor can be configured to convert a change of a pressure applied to a specific portion of the touch screen or a change of capacitance occurring in the specific portion to an electric input signal. The touch sensor can also be configured to allow a touch target, which performs a touch on the touch screen, to detect a touch position, a touch area, a touch pressure and touch capacitance on the touch sensor.

Further, the roll-slide mobile terminal 100 according to this modified embodiment may include a deformation sensing mechanism capable of sensing deformation of the flexible display unit 151. The deformation sensing mechanism may be included in the sensing unit 140.

The deformation sensing mechanism may be provided in the flexible display unit 151 or a case 201 to sense information related to deformation of the flexible display unit 151. In this instance, the information related to deformation may include a direction of the flexible display unit 151 which is modified, a modified level, a modified position, a modified time and restored acceleration of the deformed flexible display unit 151. In addition, the information related to deformation may include various kinds of information to be sensed by bending of the flexible display unit 151.

Also, the controller 180 can modify information displayed on the flexible display unit 151 or generate a control signal for controlling functions of the roll-slide mobile terminal 100, based on the information related to deformation of the flexible display unit 151 sensed by the deformation sensing means. State deformation of the flexible display unit 151 is not limited to deformation caused by an external force. For example, when the flexible display unit 151 has the first state, the first state can be modified to the second state by a command of a user or an application. In this way, in order that the flexible display unit 151 is modified without external force, the flexible display unit 151 may include a driving unit.

In addition, the flexible display unit 151 may be bent 180 degrees. Some area of the flexible display unit 151 may also be positioned on the front surface and the other area may be positioned on the rear surface of the roll-slide mobile terminal 100. The overall area of the flexible display unit 151 is fixed such that the extent of the area located in the rear surface (the second area) may decrease if the extent of the area located in the front surface (the first area) increases.

Figure 4:
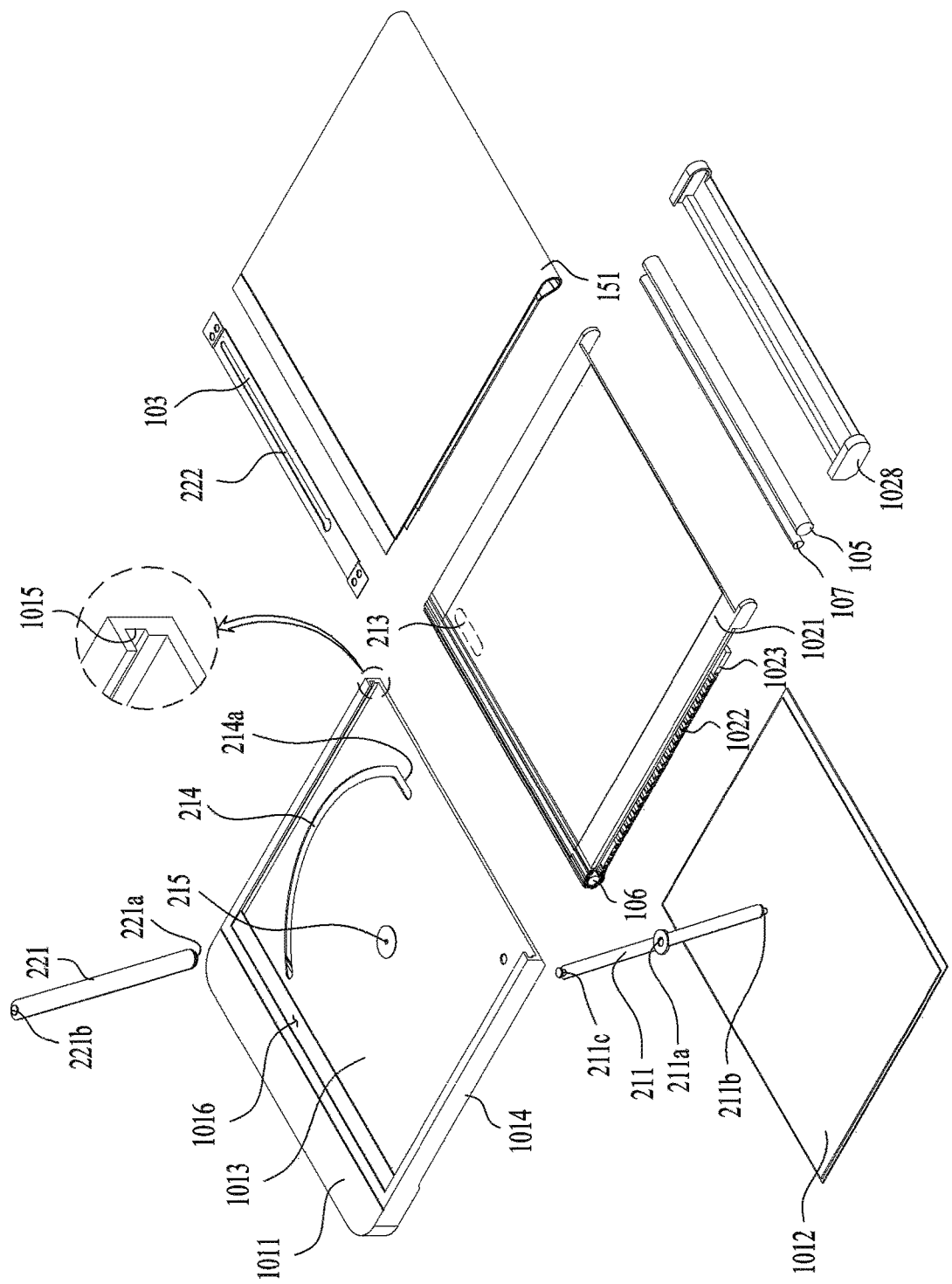
FIG. 4 is an exploded perspective view of the roll-slide mobile terminal according to an embodiment of the present invention, viewed in a front direction.
Figure 5:
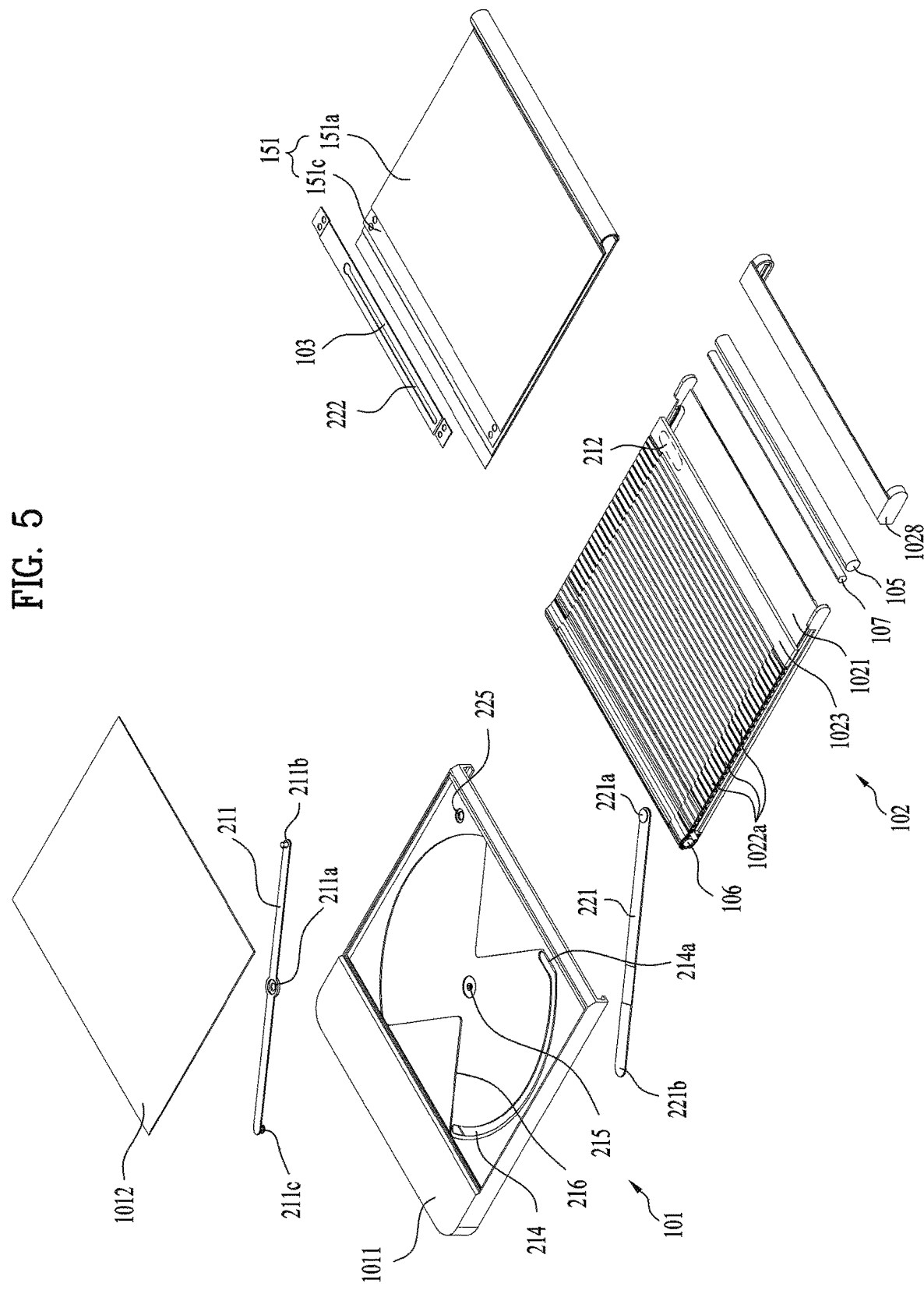
FIG. 5 is an exploded perspective view of the roll-slide mobile terminal according to an embodiment of the present invention, viewed in a rear direction.

Next, FIG. 4 is an exploded perspective view of the roll-slide mobile terminal 100 viewed in a front direction, and FIG. 5 is an exploded perspective view of the roll-slide mobile terminal 100 viewed in a rear direction. As shown in FIGS. 2 and 3, the roll-slide mobile terminal 100 includes a first frame 101; a second frame 102 that can slide with respect to the first frame 101; and a third frame 103 that can slide in a first direction with respect to the second frame 102.

The first frame 101 is provided as a basic frame of the roll-slide mobile terminal 100. One end of the flexible display unit 151 is coupled to the first frame 101 and a drive unit configured to guide the sliding movement of the second and third frames 102 and 103 is coupled to the first frame 101. As shown in FIG. 4, the first frame 101 may include an edge portion 1011 provided in a predetermined edge area of the mobile terminal; and a middle portion 1013 formed in a plate shape. The middle portion 1013 and the edge portion 1011 may be integrally formed with each other or coupled to each other by an auxiliary member. The edge portion 1011 may be provided in a second-direction end of the roll-slide mobile terminal 100 and the middle portion 1013 may form a flat plate. The edge portion 1011 may be exposed outside and the middle portion 1013 may be covered by flexible display unit 151 and the second frame 102 not to be exposed outside.

As shown in FIG. 4, the first frame 101 may also include a side portion 1014 defining a lateral surface of the mobile terminal 100. The interface unit, the user input unit and a USIM card inserting slot may be arranged in the side portion 1014. An antenna can also be realized by using the side portion 1014.

Further, the second frame 102 is coupled to the first frame 101 and slides in the first or second direction. As shown, the second frame 102 may include a flat portion 1021 provided in a front surface of the middle portion 1013 of the first frame; and a bending portion 1022 that is bendable at the flat portion 1021 in the second direction. The bending portion 1022 may be insertedly bendable towards a rear surface of the middle portion 1013.

Figure 6:
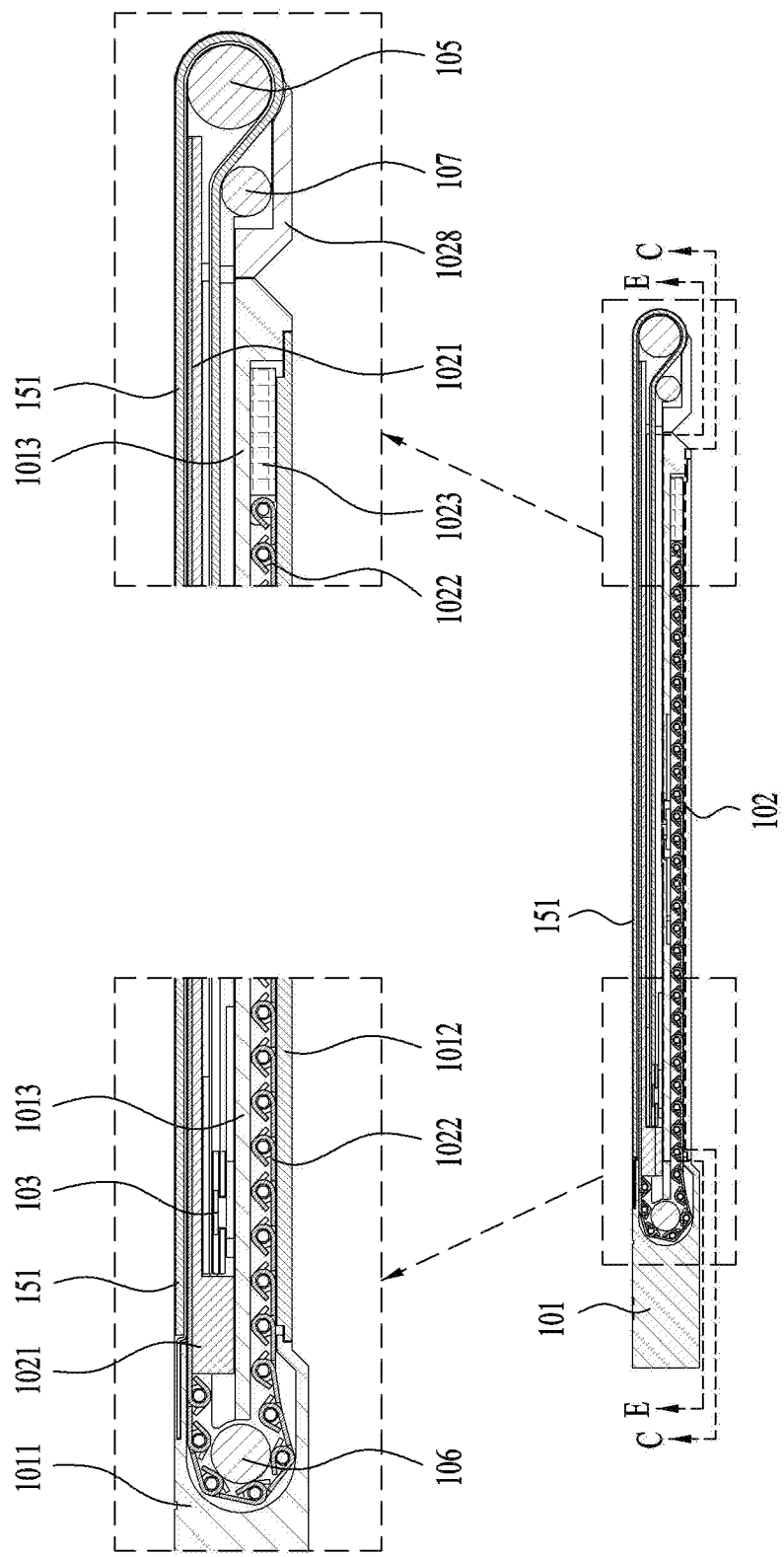
FIG. 6 is a cross-sectional view taken along line A-A of FIG. 2.
Figure 7:
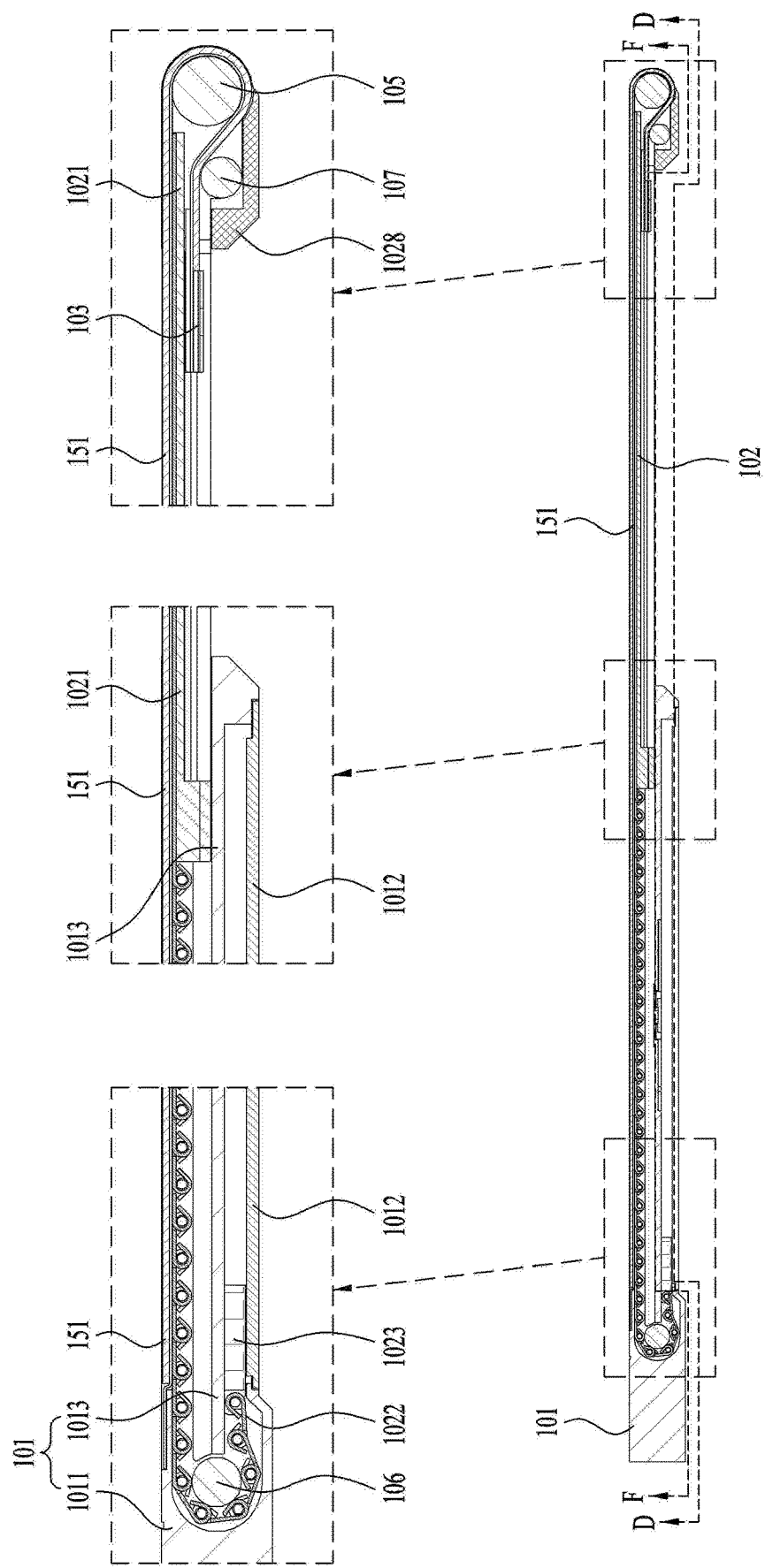
FIG. 7 is a cross-sectional view taken along line B-B of FIG. 2.

Next, FIG. 6 is a cross-sectional view taken along line A-A of FIG. 2, and FIG. 7 is a cross-sectional view taken along line B-B of FIG. 2. The bending portion 1022 may be movable from the front surface towards the rear surface or vice versa based on the current state of the mobile terminal 100. Accordingly, the bending portion 1022 occupies a large area on the rear surface of the middle portion 1013 in the first state and a large area on the front surface of the middle portion 1013 in the second state. The flat portion 1021 may be always located on the front surface of the middle portion 1013 and the bending portion 1022 may be located on the front or rear surface of the middle portion 1013 based on the state of the mobile terminal.

The bending portion 1022 may be configured of a plurality of support bars 1022a (see FIG. 5) extended in a third direction that is perpendicular to the first direction. The support bars 1022a may have a predetermined thickness or be bent to enhance the strength. The support bars may also be partially rolled in a ring shape and a hinge pin may be inserted in a rolled area to couple each two neighboring support bars 1022a. Each support bar 1022a may be rotatable with respect to its neighboring support bar and the hinge pin such that an angle between each two neighboring support bars 1022a is variable. Accordingly, the bending portion 1022 can be bent to overlap with the front surface and the rear surface.

A slide portion 1023 may be further provided in one end of the bending portion 1022 to guide the sliding movement of the bending portion 1022. A slide slot 212, to which one end 211b of a first control bar of the first drive unit which will be described later is coupled, is formed in the slide portion 1023 such that the slide portion 1023 can guide the sliding movement of the second frame 102.

The slide portion 1023 may be one end of the bending portion such that it may move in the reverse direction, compared with the moving direction of the flat portion 1021. When the first state is changed into the second state in the roll-slide mobile terminal 100, the flat portion 1021 moves in the first direction and the slide portion 1023 moves in the second direction. At this time, the bending portion 1022 may occupy a larger area on the front surface of the middle portion 1013.

In addition, the flexible display unit 151 may have one end coupled to the first frame 101 and be extended in the first direction that is the reverse direction of the bending portion 1022 provided in the second frame 102. The flexible display unit 151 can be bent with rolling a first roller 105 coupled to the flat portion 1021 and then extended towards the rear surface of the flat portion 1021. The other end of the flexible display unit 151 is located on the rear surface of the flat portion 1021 and coupled to the third frame 103 so as to slide in the first and second directions.

Referring to FIGS. 6 and 7, the third frame 103 and the flexible display unit 151 may be located on the front surface of the middle portion 1013 of the first frame 101 and the rear surface of the flat portion of the second frame 102, respectively. The slide portion 1023 located in the end of the bending portion 1022 may be located on the rear surface of the middle portion 1013.

Referring to FIG. 6, the layer structure in the first state may be configured of the first area of the flexible display unit 151. The flat portion 1021, the second area and the third frame 103 of the flexible display unit 151, the middle portion 1013 of the first frame, the bending portion 1022, the slide portion 1023 and the rear portion 1012 of the first frame defining the rear surface that is located in the most backward direction from the front surface.

Referring to FIG. 7, one end of the flexible display unit 151 coupled to the middle portion 1013 and the edge portion 1011 of the first frame 101, the rear portion 1012 and the second roller 106 having the bending portion 1022 rolled there around are located on the left side shown in the drawing in the second state. The flat portion 1021 of the second frame, the first roller 105 and the third roller 107, and the third frame 103 move to right side.

The flexible display unit 151 may include a display panel 151b configured to output an image; and a back plate 151c configured to support a rear surface of the display panel 151b.

The display panel 151b may be a flexible image display device (e.g., OLED). The back plate 151c may be provided in the rear surface of the display panel 151b and a metal plate that is bendable together with the display panel 151b when it is bending, with a predetermined strength enough to support the display panel 151b.

Further, the back plate 151c and the display panel 151b may be bonded to each other, using an adhesive material. Examples of the adhesive material may include a double-sided tape (e.g., OCA) that is extendible in a preset range such as a foam material. Accordingly, the adhesive material may offset a slip phenomenon that might be caused by a difference between the curvature radius of the back plate 151c and that of the display panel 151b.

A groove may also be formed in a surface of the bending area of the back plate 151c in the third direction to naturally facilitate the bending, when the flexible display panel 151 is bending. In addition, the bending portion 1022 and the flexible display unit 151 are rolled in the reverse directions. When the current state of the roll-slide mobile terminal is changed into the first state or second state, the slide portion 1023 located in the end of the bending portion 1022 and the third frame 103 located in the end of the flexible display unit 151 moves in the reverse directions. Specifically, when the first state is changed into the second state, the third frame 103 moves in the first direction and occupy a larger area of the front surface of the flexible display panel 151 provided in the mobile terminal 100.

A first roller 105 may be further provided in the second frame 102 and configured to have the flexible display unit 151 rolled there around. Also, a second roller 106 may be further provided in the first frame 101 and have the bending portion 1022 rolled there around. As shown in FIG. 6, the second roller 106 may be located in a gap 1016 formed between the edge portion 1011 and the middle portion 1013 and rotatably coupled to the first frame 101. The first roller 105 and the second roller 106 may also be rotated in the reverse directions. When the second area of the flexible display unit 151 is moved in the first direction, the end of the bending portion 1022 also moves in the reverse direction (the second direction).

Figure 8:
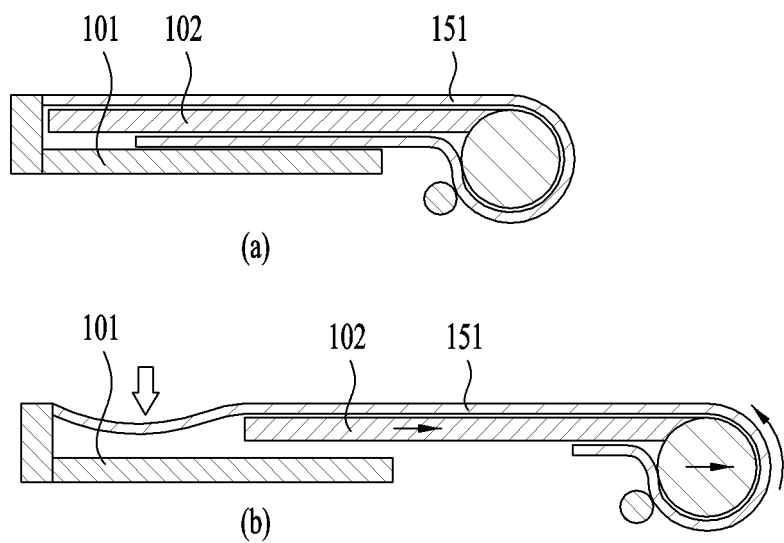
FIG. 8 is a diagram illustrating a problem that could occur if there is no bending portion.

Further, the bending portion 1022 is advantageous so as to provide a structure that supports the expanded first area when the current state of the roll-slide mobile terminal 100 is changed into the second state. Unless the bending portion 1022 is provided as shown in FIG. 8, an empty space might be generated in the rear surface of the first area of the flexible display unit 151 supported by the second frame 102 moving in the first direction and the empty space might cause corrugation in the flexible display unit 151.

Even if a support structure is provided in the rear surface of the second frame 102, the empty space as large as the thickness of the second frame 102 might be generated to cause deflection in the display unit. accordingly, as shown in FIG. 9, the second frame 102 may be configured to keep the height of one surface, that contacts with the rear surface of the flexible display unit 151, equal to the heights of the flat portion 1021 and the bending portions 1022 such that in the second state, the bending portion 1022 can support the first area supported by the flat portion 1021 in the first state.

In addition, the bending portion 1022 may be movable along a rail 1015 formed in the first frame 101. As shown in FIG. 4, the rail 1015 may be provided in both sides of the middle portion 1013 provided in the first frame 101 and have a corresponding width to the thickness of the bending portion 1022, with a groove shape extended in the first direction. The rail 1015 may be formed in an inner surface of the side portion defining the lateral surface of the first frame 101. The rail 1015 may be configured to guide the first-direction movement of the bending portion 1022 so as to prevent the deflection of the bending portion 1022.

The first frame 101 may further include a rear portion 1012 defining an external design of the rear surface as shown in FIG. 3. The rear portion 1012 may form the external rear design of the roll-slide mobile terminal 100 and cover the drive unit and the bending portion 1022 of the second frame 102 not to expose the drive unit to the rear surface in the first state.

The drive unit may include a first drive unit 210 configured to guide the sliding movement of the third frame 103 coupled to the other end of the flexible display unit 151; and a second drive unit 220 configured to guide the sliding movement of the bending portion 1022. The first and second drive units may be arranged in both sides of the first frame 101 to realize the reverse-direction movements with respect to the first frame 101 coupled thereto. The first drive unit 210 may be arranged in a front surface of the first frame and the second drive unit 220 may be arranged in a rear surface of the first frame 101. Accordingly, the third frame 103 coupled to the first drive unit 210 may be located on the front surface of the first frame 101 and one end of the bending portion 1022 may be located on the rear surface of the first frame 101.

To locate the other end of the flexible display unit 151 on the front surface of the first frame 101, the distance between the first and second areas of the flexible display unit 151 has to be narrow. In other words, to space the first and second areas a distance as far as the thickness of the flat portion 1021 of the second frame 102, the curvature of the bending flexible display unit 151 has to be very small disadvantageously. As the curvature of the bending flexible display unit 151 is getting smaller, the stress applied to the flexible display unit 151 is getting larger enough to heighten the possibility of damage to the flexible display unit 151.

Accordingly, the roll-slide mobile terminal 100 may further include a third roller 107 configured to support the second area to bend towards the front surface so as to narrow the distance between the first area and the second area even though the flexible display unit 151 is bending along a gentle curve.

A roll cover 1028 may be further provided to cover the third roller 107 and allow the user to pull the second frame 102 in the first direction. The roll cover 1028 shown in FIG. 6 may define the rear portion 1012 of the first frame 101 and the rear surface of the roll-slide mobile terminal 100. It is shown in the drawing that the roller cover 1028 is located on the rear surface of the roll-slide mobile terminal 100 but the roll cover may be extended even to the lateral surface to protect the curved area of the flexible display unit 151 rolled around the first roller 105.

When the roll-slide mobile terminal 100 is transited from the first state into the second state, the flat portion 1021 of the second frame 102 is moving in the first direction and the slide portion 1023 of the second frame 102 is moving in the second direction. The flat portion 1021 located on the front surface of the middle portion 1013 of the first frame 101 and the slide portion 1023 located on the rear surface of the middle portion 1013 of the first frame 101 may move the same distance in the reverse directions, respectively. The first 210 may be provided to synchronize the moving distance of the flat portion 1021 and the moving distance of the slide portion so as to perform such symmetric movement stably. The first drive unit 210 may be configured to guide the flat portion 1021 and the slide portion 1023 to move the same distances in the reverse directions, respectively.

Next, FIG. 10 is a diagram illustrating the first drive unit 210 provided in the roll-slide mobile terminal 100. In particular, FIG. 10 (a) is a sectional diagram along C-C of FIG. 6 and FIG. 10 (b) is a sectional diagram along D-D of FIG. 7 as a view illustrating a state where only the rear portion 1012 of the first frame 101 is removed from a state viewing the rear surface of the mobile terminal 100 of FIG. 3. In the first state, the first drive unit 210 is hidden by the bending portion 1022 of the second frame 102 and is shown as a dotted line.

The first drive unit 210 includes a first control bar 211 provided in a rear surface of the middle portion 1013 provided in the first frame 101. The first control bar 211 has a center 211a rotatably coupled to a center of the middle portion 1013 of the first frame 101. One end 211b of the first control bar is coupled to the slide portion 1023 of the second frame 102 and the other end 211c is coupled to the flat portion 1021. When the first state is transited into the second state in the mobile terminal 100, the flat portion 1021 is moving from the front surface of the middle portion 1013 in the first direction and the slide portion 1023 is moving from the rear surface of the middle portion 1013 in the second direction. In other words, the moving directions of the flat portion 1021 and the slide portion 1023 are reverse such that the first controller bar 211 is rotatable on the center 211a rotatably coupled to the middle portion 1013.

In the control bar 211, a distance from the coupled center 211a to the end 211b may be equal to a distance from the coupled center 211a to the other end 211c. The end 211b and the other end 211c of the control bar 211 moves in arcs when the first control bar 211 is rotated such that the third-direction positions of the ends are changed based on the angle of the first control bar 211. To compensate a difference between the rotational movement and the linear movement, a first slide slot 212 may be extended in the third direction from the slide portion 1023 to which the end of the first control bar is coupled and a second slide slot 213 may be extended in the third direction from the flat portion 1021 to which the other end 211c of the first control bar is coupled.

In addition, the first slide slot 212 is coupled to the first control bar 211 towards the front surface and the second slide slot 213 is coupled thereto towards the rear surface. The first slide slot 212 and the second slide slot 213 may be as long as a distance where the first control bar 211 moves in the third direction when the first state is transited into the second state.

As the flat portion 1021 is directed to the front surface of the middle frame, a third slide slot 214 may be formed in the middle portion 1013 in an arc shape as shown in FIG. 10 (b), so as to couple the flat portion 1021 and the first control bar 211 to each other. The other end 211c of the first control bar may be inserted in the second slide slot 213 of the flat portion 1021 through the third slide slot 214.

The third slide slot 214 may further include a securing slot 225a (see FIG. 12) extended from the area, where the other end 211c of the first control bar is located in the second state, in the third direction as shown in FIG. 10 (a). The securing slot 225a restricts the rotation of the first control bar 211 to secure the second state transited by the user pulling the second frame 102 in the first direction. A ribbon-shaped groove 216 may be formed in the middle portion 1013 to guide the rotation of the first control bar 211 as shown in FIG. 10 (b).

Next, FIG. 11 is a diagram illustrating the second drive unit 220 provided in the roll-slide mobile terminal 100. While the flat portion 1021 of the second frame 102 is moving in the first direction, the first area of the flexible display unit 151 is expanded and the third frame 103 to which the other end of the flexible display unit 151 is coupled is moving in the first direction. The second drive unit 220 may be configured to guide the first-direction movement of the third frame 103. The second drive unit may include a second control bar 221 and a fourth slide slot 222.

In particular, FIG. 11 (a) is a sectional diagram along E-E of FIG. 6 and FIG. 11 (b) is a sectional diagram along F-F illustrating only a member located towards the front surface of the middle portion 1013. One end 221a of the second control bar is rotatably coupled to the middle portion 1013 and the other end 221b thereof is coupled to the fourth slide slot 222 formed in the third frame 103. When the second control bar 221 is rotated on the end 221a coupled to the middle portion 1013, the other end 221b is moving in arcs. During the moving of the other end 221b of the second control bar, only the first and second direction moving may affect the third frame 103 and the third direction moving may use the fourth slide slot 222 extended in the third direction for the offsetting of the movement. When a state of FIG. 11 (a) is transited to a state of FIG. 11 (b) or vice versa in the second control bar 221, the other end 221b is moving along the fourth slide slot 222 formed in the third frame 103.

When the first state is transited into the second state, the user pulls the second control bar in a direction where the first and second frames 101 and 102 are spaced apart and the flat portion 1021 of the second frame 102 moves in the first direction, while the slide portion 1023 and the third frame 103 moves in the second direction and the first direction, respectively. At this time, the state shown in FIG. 11 (a) is naturally transited into FIG. 11 (b) state in the second control bar 221.

In contrast, when user pushes the second frame 102 to the first frame 101. In other words, pushing the second frame 102 in the second direction, the second area of the flexible display unit 151 has to be wide and the third frame 103 has to move in the second direction accordingly. When the flat portion 1021 of the second frame 102 moves in the second direction, the first control bar 211 is rotated as shown in FIG. 10 (a) from a state shown in FIG. 10 (b). At this time, the other 3 end 211c of the first control bar is rotated in the second direction to pull the other end 221b of the second control bar.

Specifically, the force used in pulling the second control bar 221 in the second direction is needed to move it in the direction where the second area of the flexible display unit 151 is getting wide when the first state is transited to the second state. The sliding movement of the third frame 103 could be facilitated by using electric power of a motor. However, one embodiment of the present invention may provide an elastic unit 225 configured to support the rotational movement of the second control bar 221, without the motor.

As shown in FIG. 11, the elastic unit according to the embodiment may be a coil spring 225 having one end 225a coupled to the first frame 101 and the other end 225b coupled to the second control bar 221. To make the coil spring tensile, a predetermined force is needed and a tensile spring may be used for that tensile. When the user pulls the second frame 102 in the first direction to transit the first state into the second state, the third frame 103 also moves in the first direction and the coil spring is lengthened to be given tension.

Once the first control bar 211 is secured to the securing slot 214a mentioned above, the second state is secured and the coil spring 225 is secured in a state of being tensioned. When the user transits the second state into the first state of the roll-slide mobile terminal 100 by pushing the second frame 102 in the second direction, the first control bar 211 is separated from the securing slot 214a and rotated along the third slide slot 214. Hence, the second control bar 221 is rotated by the elasticity of the elastic unit 225 as shown in FIG. 11 (b) and FIG. 11 (c) to move the third frame 103 in the second direction.

Next, FIGS. 12 and 13 are diagrams illustrating another embodiment of the second drive unit 220 provided in the roll-slide mobile terminal 100. The elastic unit 225 of the second drive unit 220 may be configured to apply an elastic force to rotate the second control bar 221 when the mobile terminal is switched from the second state into the first state.

Rather than the above-noted coil spring 225, a torsion spring 225 may be used as shown in FIG. 12. The torsion spring 225 may have one metal fan-shaped end 225a and the other end 225b that form a preset angle, with a coil wounded around the spring between the ends, and be configured to provide a predetermined elasticity applied to restore the angle between the ends in a preset angle. The ends of the torsion spring 225 are arranged at a preset angle in the first state of the mobile terminal 100. One end is coupled to the first frame 101 and the other end is coupled to the second control bar 221. When the user pushes the second frame 102 in the second direction in the second state of the mobile terminal, the first control bar 211 is released from the securing slot 214a and the second control bar 221 is rotated by the elasticity of the torsion spring 225. After that, the third frame 103 is moved in the second direction and the roll-slide mobile terminal 100 is transited into the first state as shown in FIG. 12 (b).

FIG. 13 shows one embodiment using a compound spring 225. The elastic unit 225 is not limited to the specific types such as the coil spring 225 or the torsion spring 225 but it may be diverse types. As shown in FIG. 13, one end the other end of the elastic unit 225 may be coupled to the second frame 102 and the third frame 103, respectively, as shown in FIG. 13. In other words, the elastic unit 225 may be the member configured to provide a predetermined force for moving the third frame 103 with respect to the second frame 102 or the first frame 101 in the second direction such that one end 225a thereof may be coupled to the first frame 101 or the second frame 102 and the other end 225b thereof may be coupled to the second control bar 221 or the third frame 103.

As described above, since the roll-slide mobile terminal of the present invention does not limit a point where the flexible display unit 151 is folded to a specific position, the durability of the flexible display unit 151 is improved. Also, since the flexible display unit 151 can stably be supported when it is extended, it is possible to minimize the difficulty in a touch input. Further, the flexible display unit 151 can be prevented from being damaged by external impact at the side where the flexible display unit 151 is folded.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A roll-slide mobile terminal comprising:
   a first frame;
   a second frame configured to slide with respect to the first frame in a first direction or a second direction opposite the first direction;
   a first roller provided in a first end of the second frame;
   a third frame provided in a rear surface of the second frame;
   a flexible display unit rolled around the first roller and having a first end fixed to the first frame and a second end coupled to the third frame and placed on a rear surface; and a drive unit configured to guide a sliding movement of the second frame with respect to the first frame in the first direction to transition the roll-slide mobile terminal from a first state to a second state, and to guide a sliding movement of the second frame with respect to the first frame in the second direction to transition the roll-slide mobile terminal from the second state to the first state, wherein the third frame slides with respect to the second frame in the first direction when the second frame moves in the first direction.

2. The roll-slide mobile terminal of claim 1, wherein an area of a front surface of the roll-slide mobile terminal that is occupied by the flexible display unit is larger in the second state than the first state.

3. The roll-slide mobile terminal of claim 1, wherein the first frame comprises:
an edge portion to which the first end of the flexible display unit is coupled; and
a middle portion in which the drive unit is provided.

4. The roll-slide mobile terminal of claim 3, wherein the second frame comprises:
a flat portion provided on a front surface of the middle portion; and
a bending portion provided in the second direction of the flat portion and configured to be partially located on a rear surface of the middle portion.

5. The roll-slide mobile terminal of claim 4, wherein the bending portion comprises a plurality of support bars extended in a third direction that is perpendicular to the first direction and arranged in parallel with the second direction.

6. The roll-slide mobile terminal of claim 4, wherein the bending portion slides along a rail formed in the first frame.

7. The roll-slide mobile terminal of claim 4, further comprising:
a second roller coupled to the first frame and having the bending portion rolled there around.

8. The roll-slide mobile terminal of claim 7, further comprising:
a third roller provided adjacent to the first roller in the second direction and configured to support the flexible display unit located on the rear surface of the roll-slide mobile terminal.

9. The roll-slide mobile terminal of claim 4, wherein the first frame comprises a gap formed between the edge portion and the middle portion, with the bending portion penetrating there through.

10. The roll-slide mobile terminal of claim 4, wherein the drive unit comprises a first drive unit arranged in a rear surface of the middle portion and configured to guide movements of the first frame with respect to the second frame.

11. The roll-slide mobile terminal of claim 10, wherein the first drive unit comprises:
a first control bar having a center rotatably coupled to the first frame;
a first slide slot extended from one end of the bending portion in a third direction perpendicular to the first direction and configured to receive a first slide projection projected from one end of the first control bar; and
a second slide slot extended from the flat portion in the third direction and configured to receive a second slide projection projected from the other end of the first control bar.

12. The roll-slide mobile terminal of claim 11, wherein the first drive unit further comprises:
a third slide slot formed in the first frame in an arc shape with respect the center of the first control bar, and
wherein the second slide projection is coupled to the second slide slot through the third slide slot.

13. The roll-slide mobile terminal of claim 12, further comprising:
a securing slot extended from an end of the third slide slot in the third direction,
wherein the second slide projection is located in the securing slot in the second state.

14. The roll-slide mobile terminal of claim 10, wherein the drive unit further comprises a second drive unit provided in a front surface of the middle portion and configured to guide the movements of the first frame with respect to the second frame.

15. The roll-slide mobile terminal of claim 14, wherein the second drive unit comprises:
a fourth slide slot extended in the third direction and formed in the third frame; and
a second control bar having one end rotatably coupled to the middle portion and a third slide projection projected from the other end, and
wherein the third slide projection is inserted in the fourth slide slot to slide the second control bar with respect to the third frame in the third direction.

16. The roll-slide mobile terminal of claim 15, wherein the second drive unit further comprises an elastic unit having one end fixed to the first or second frame and the other end connected with the second control bar or the third frame, and
wherein the elastic unit provides a predetermined elasticity to pull the third frame in the second direction when the roll-slide mobile terminal is transited from the second state to the first state.

17. The roll-slide mobile terminal of claim 4, wherein the first frame further comprises a rear portion configured to cover a rear surface of the bending portion.

18. The roll-slide mobile terminal of claim 1, wherein the flexible display unit comprises:
a display panel; and
a back plate configured to support a rear surface of the display panel and coupled to the first frame and the third frame.

19. The roll-slide mobile terminal of claim 1, wherein the drive unit comprises:
a first control bar having a center rotatably coupled to the first frame and configured to slide in first and second slide slots extended in a third direction perpendicular to the first direction, and
wherein the first control bar rotates counterclockwise and slides within the first and second side slots when transitioning from the first state to the second state.

20. The roll-slide mobile terminal of claim 19, wherein the drive unit further comprises:
a second control bar having one end rotatably coupled to a third slide slot in the first frame and the other end slidably coupled to a fourth slide slot in the third frame, and
wherein the second control bar slides within the third and fourth side slots when transitioning from the first state to the second state.

* * * * *